June 22, 1954     G. A. SLIGAR     2,681,648
VEHICLE HEATER
Filed Aug. 3, 1951
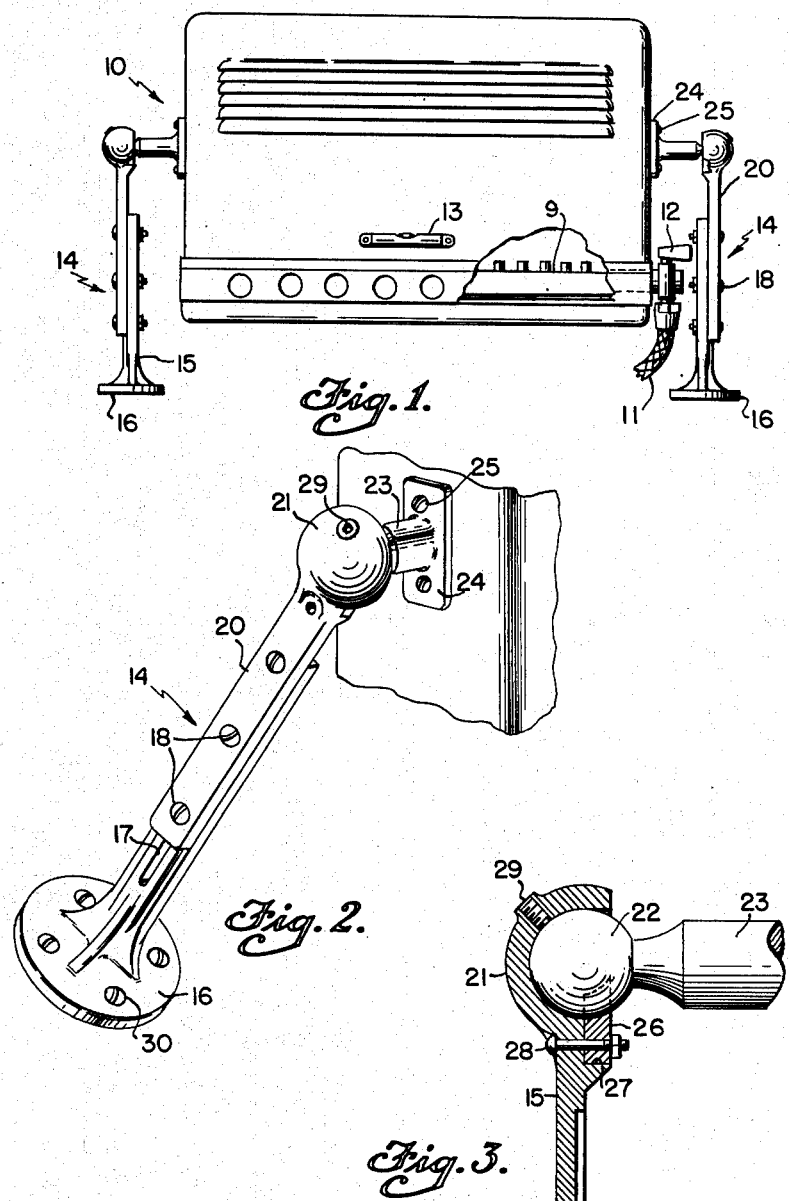
GEORGE ANDREW SLIGAR
*INVENTOR*
BY *Herbert J. Brown*
*ATTORNEY*

Patented June 22, 1954

2,681,648

UNITED STATES PATENT OFFICE 2,681,648

VEHICLE HEATER

George Andrew Sligar, Fort Worth, Tex.

Application August 3, 1951, Serial No. 240,253

1 Claim. (Cl. 126—85)

This invention relates to heaters for vehicles, and has reference to a heater which operates independently of the vehicle's engine.

An object of the invention is to provide a heater for general use, but particularly one which is adaptable for use during emergencies, as when the stalled vehicle is setting at an angle with respect to the horizontal.

A particular object of the invention is to provide a heater for the described purpose which is capable of using an inexpensive fuel, such as liquified petroleum gases wherein the burners thereof must be substantially horizontal for effective operation.

Generally, the invention contemplates a heater which may be readily adapted for use in school buses, troop transport vehicles, airplanes, trucks and other vehicles capable of carrying an auxiliary supply of fuel for heating purposes.

These and other objects of the invention will become apparent from the following description and the accompanying drawings, wherein:

Figure 1 is a front elevation of a liquified petroleum gas heater embodying the features of the present invention.

Figure 2 is a perspective view of one of the adjustable standard assemblies, and showing the same attached to a broken part of the heater housing.

Figure 3 is an enlarged broken section and elevation of one of the ball socket joints for adjustably supporting the illustrated heater.

The invention is adaptable for use in connection with a gas burning heater, generally designated by the numeral 10, having a flexible hose 11 connecting the heater's gas cock 12 with a fuel storage tank, not shown. Preferably, the tank referred to will contain butane, propane, or the like, and the heater 10 will operate in the usual manner and is not, therefore, described in detail. The burner 9, connected with the gas cock 12, is shown in Figure 1. For reasons which will become apparent, a spirit level 13 is secured to the heater 10 at any suitable location whereby the same may be conveniently used by the occupants of the vehicle.

Standard assemblies 14 are provided outwardly of each end of the heater 10, and each standard assembly is comprised of a vertical standard 15 having a round base 16 on the lower end thereof, together with a vertical slot 17 therethrough for receiving bolts 18 which are positioned through a longitudinal standard extension 20. The upper end of each extension 20 is provided with an integral socket member 21 for receiving the ball end 22 of a trunnion 23 which is secured to the heater 10 by means of a flange 24 on the inner end thereof and having screws 25 positioned therethrough for securing the same in place. Both trunnions are in axial alignment with each other. Each ball 22 is held in its socket 21 by means of a retainer in the form of a plate 26 which is received in and secured to the standard 15 by means of a recess 27 and a bolt 28 passing therethrough, as illustrated in detail in Figure 3. A set screw 29 through at least one socket member 21 and bearing against the surface of the associated ball 22 will hold the heater 10 in the desired adjusted position about the axis of the trunnions. The entire assembly may be secured in any suitable place in the vehicle by means of screws 30 positioning through openings, not shown, in the standard bases 16.

In operation, the heater 10 is installed in a vehicle in the manner described, and in the event that the vehicle becomes stalled and the heater is no longer level, the heater may be adjusted to the horizontal by loosening the bolts 18 positioned through the standards 15 and raising or lowering the respective extensions 20 as required, and by then tightening said bolts. During such adjustment, the set screw 29 in one of the sockets 21 is partially unscrewed; and after the desired adjustment of the heater has been made, the set screw is again tightened. Thus, even though the vehicle is stalled, or possibly inverted, the heater 10 can be adjusted to the necessary horizontal position for operation.

It is to be understood that an automatic cut-off valve, not shown, may be included in the heater 10, and which valve will be within the spirit and intention of the present invention. The type of valve referred to is well known to the art and operates when the flame in the burner is extinguished. By this arrangement, the occupants of the vehicle will be protected from gas fumes when the heater is not burning.

The present invention is not limited to the specific construction herein shown and described, but may be made in many ways within the scope of the appended claim.

What is claimed is:

In combination, a liquefied petroleum gas heater adapted for installation in a vehicle, said heater comprising an elongated normally horizontal housing having an elongated normally horizontal burner therein, said housing comprising end walls and a front wall, the front wall of said housing being provided with lower combustion air admission openings and upper outlets for heated gases, a flexible fuel conduit connected to said burner and adapted to be connected to a fuel storage tank carried by said vehicle, separate extensible standard assemblies adapted to be secured to a horizontal surface of the vehicle in which said heater is to be installed and opposite said end walls of said housing, ball and socket joints connecting the upper ends of said standards with said end walls of said housing, and a spirit level secured to the outer surface of said housing in a normally horizontal position and along the length of said housing and whereby said burner may be leveled by adjusting said extensible standards when the referred to surface of said vehicle is in a position other than horizontal.

References Cited in the file of this patent

UNITED STATES PATENTS

| Number | Name | Date |
|---|---|---|
| 78,475 | O'Brien | June 2, 1868 |
| 1,460,697 | Bendlin | July 3, 1923 |
| 1,973,165 | Fioroni | Sept. 11, 1934 |
| 2,068,111 | Resek et al. | Jan. 19, 1937 |

FOREIGN PATENTS

| Number | Country | Date |
|---|---|---|
| 429,490 | Great Britain | May 30, 1935 |